United States Patent

Bustamante et al.

[11] Patent Number: 5,982,058
[45] Date of Patent: Nov. 9, 1999

[54] TWO-PHASE STEPPER MOTOR

[75] Inventors: Eleazor Felipe Bustamante, New Hamburg; Phillip G. Adams, Toronto; Catherine Hoskin, Georgetown; David Yan Leng, Mississauga; Grigori Roubinchtein, North York, all of Canada

[73] Assignee: CTS Corporation, Elkhart, Ind.

[21] Appl. No.: 09/146,128

[22] Filed: Sep. 2, 1998

[51] Int. Cl.$^6$ .................................................. H02K 37/00
[52] U.S. Cl. ....................... 310/49 R; 310/268; 310/266; 310/156
[58] Field of Search ................................... 310/268, 266, 310/49 R, 38, 156, 44, 68 R

[56] References Cited

U.S. PATENT DOCUMENTS

| | | | |
|---|---|---|---|
| 3,749,458 | 7/1973 | Thylefors | 308/142 |
| 3,971,963 | 7/1976 | Koike et al. | 310/154 |
| 4,228,378 | 10/1980 | Humbert | 310/268 |
| 4,645,430 | 2/1987 | Carleton | 417/359 |
| 4,707,645 | 11/1987 | Miyao et al. | 318/254 |
| 4,823,038 | 4/1989 | Mizutani et al. | 310/257 |
| 4,973,866 | 11/1990 | Wang | 310/49 R |
| 4,985,669 | 1/1991 | Smith | 318/685 |
| 5,054,940 | 10/1991 | Momose et al. | 384/192 |
| 5,298,825 | 3/1994 | Oudet et al. | 310/156 |
| 5,331,237 | 7/1994 | Ichimura | 310/44 |
| 5,334,893 | 8/1994 | Oudet et al. | 310/38 |
| 5,512,871 | 4/1996 | Oudet et al. | 310/90 |
| 5,770,900 | 6/1998 | Sato et al. | 310/49 R |
| 5,831,356 | 11/1998 | Aoshima | 310/49 R |

*Primary Examiner*—Nestor Ramirez
*Assistant Examiner*—Saeed Ghahramani
*Attorney, Agent, or Firm*—Mark P. Bourgeois; Mike Stackweather

[57] ABSTRACT

A two-phase electro-mechanical stepper motor having 1) a high ratio of torque per mass and torque per power draw, to be able to develop required rotating torque, 2) a magnetic circuit that allows developing of a significant holding torque while using a limited amount of electric power, and 3) two disk rotors positioned on either side of the stator with aligned poles. The actuator has a shaft extending into the actuator, and a first and second rotor, each fixedly mounted on the shaft, and each having a permanent magnet mounted thereon in opposing fashion. Additionally, there is a stator, loosely mounted around the shaft and positioned between the opposing permanent magnets, and having at least a first and second pole extending toward the first and second rotors respectively. Furthermore, there is a first and second wire coil wrapped around the first and second pole respectively to allow the formation of a first and second electromagnet respectively by passing electrical current through the first and second wire coil. The invention also has the first and second magnets each having at least a north and south pole magnet region with a transition line located therebetween, wherein the transition lines on the first and second magnet are misaligned as viewed along the shaft. A variation of the invention replaces the misaligned transition lines with misaligning the first and second poles as viewed along the shaft.

8 Claims, 3 Drawing Sheets

TWO-PHASE STEPPER MOTOR

BACKGROUND OF THE INVENTION

1. Field of the Invention

This invention relates to motors and/or actuators. In particular, there is a two-phase electromechanical stepper motor having 1) a high ratio of torque per mass and torque per power draw, to be able to develop required rotating torque, 2) a magnetic circuit that allows developing of a significant holding torque while using a limited amount of electric power, and 3) two disk rotors positioned on either side of the stator with aligned poles.

2. Description of the Related Art

Various devices dealing with stepper motors are legion. Examples of patents related to the present invention are as follows, and each patent is herein incorporated by reference for the supporting teachings:

U.S. Pat. No. 5,512,871 is a rotatable single phase electromagnetic actuator.

U.S. Pat. No. 5,334,893 is a monophase electromagnetic rotary actuator of travel between 60 and 120 degrees.

U.S. Pat. No. 5,298,825 is a single phase electromagnetic actuator with low obstruction.

U.S. Pat. No. 5,054,940 is a ceramic bearing design for attachment to a shaft.

U.S. Pat. No. 4,973,866 is a variable angle stepper motor.

U.S. Pat. No. 4,645,430 is a wet motor fuel pump with self aligning bearing.

U.S. Pat. No. 3,749,458 is a centering device for a rotary shaft.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicant's claimed invention.

Referring to FIG. 1, there is a cross section of a typical related art rotatable single phase electromagnetic actuator 10. Actuator 10 has a shaft 12 with an axis 13, a stator 14, a rotor 16, and a bearing structure 25. The stator has a magnetic field inducing wire coil 18, a stator pole shoe 20, and a bearing support 24. Bearing assembly 25 includes a top and bottom bearing retaining housing 26, and a plurality of ball bearings 28. The rotor 16 includes a set of rotor magnets 22, also called a rotor 22. It is noted that the actuator illustrates an ideal design, where the bearing parts, stator parts and rotor parts have all respective surfaces appropriately aligned either perpendicular or parallel.

3. Problem with the Related Art

A common problem occurring with multi-position valves is that they require a driving actuator that both 1) develops a significant rotating torque to move from one angular position to another, and 2) can be locked in one of the angular positions, usually by a holding torque. Both competing needs must be met without using large amounts of electric power.

Therefore, there is a need for a stepper motor that both steps to various positions and holds at those positions with low power usage. Additionally, there is a need for a motor that has a poly-phase electric power supply to enable a switch on or off the power to parts of its winding and, for example, reverse the direction of rotation.

SUMMARY OF THE INVENTION

It is a feature of the invention to provide a two-phase electro-mechanical stepper motor having 1) a high ratio of torque per mass and torque per power draw, to be able to develop required rotating torque, 2) a magnetic circuit that allows developing of a significant holding torque while using a limited amount of electric power, and 3) two disk rotors positioned on either side of the stator with aligned poles. Additionally, the motor uses a two-phase electric poly-phase electric power supply to enable switching on or off the power to parts of its winding and, for example, reverse the direction of rotation.

An additional feature of the invention is to provide an actuator that has a shaft extending into the actuator, and a first and second rotor, each rotatably fixed on the shaft, and each having a permanent magnet mounted thereon in opposing fashion. Additionally, there is a stator, loosely mounted around the shaft and positioned between the opposing permanent magnets, and having at least a first and second pole extending toward the first and second rotors respectively. Furthermore, there is a first and second wire coil wrapped around the first and second pole respectively to allow the formation of a first and second electromagnet respectively by passing electrical current through the first and second wire coil.

A further feature of the invention is to provide and actuator that has the first and second magnets each having at least a north and south pole magnet region with a transition line located therebetween, in which the transition lines on the first and second magnet are misaligned as viewed along the shaft.

Yet, another feature of the invention may be to have the first and second poles each have a longitudinal center axis that is misaligned as viewed along the shaft.

Nonetheless, a further feature of the invention may be to have the stator designed with a disc-shaped yoke for both separating and mounting the first and second pole thereto.

An additional feature of the invention is that the first and second magnets are polarized in a way that will allow the shaft to rotate to a first, second or third position by energizing either the first, second or both electromagnets.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

Figure 1:
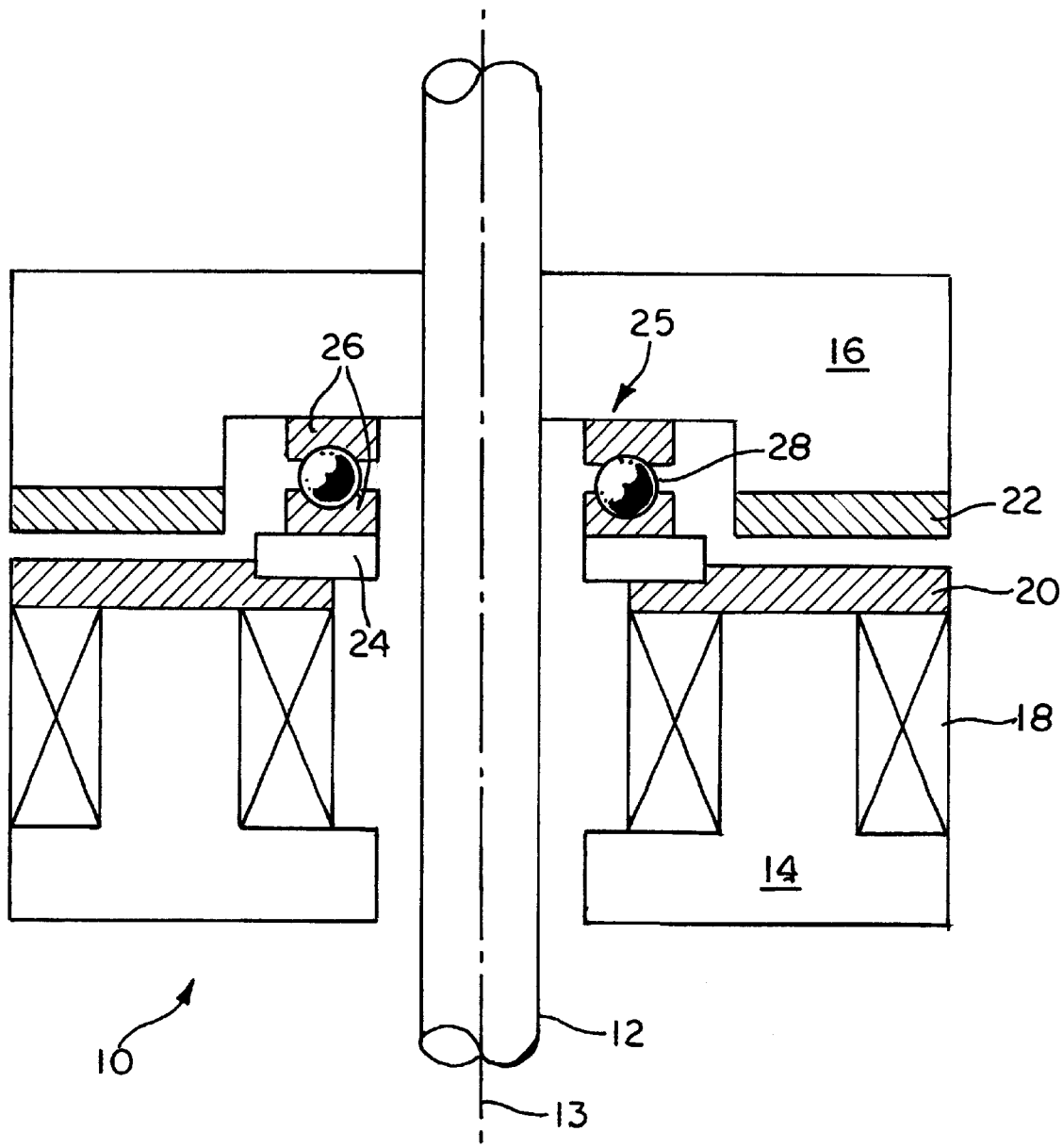
FIG. 1 is a cross sectional illustration of a related art actuator design.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

The present invention provides an electromechanical actuator. Regarding FIG. 2, there is illustrated a perspective exploded view of the preferred embodiment. In particular, there is an electromechanical stepper motor having 1) a high ratio of torque per mass and torque per power draw, to be able to develop required rotating torque, and 2) a magnetic circuit that allows development of a significant holding torque while using a limited amount of electric power. Regarding FIG. 2, there is a preferred embodiment of a novel stepper motor or actuator 10. Specifically, actuator 10 has three major soft-magnetic parts that make up the magnetic circuits of the motor, namely: a stator 34, a first rotor 30 and a second rotor 38. Each rotor 30 and 38 has a respective multi-pole magnet 32 and 36. There are thus two magnetic circuits or parts of the motor 10, namely a first or top magnetic circuit or portion 64 and a second or bottom portion or magnetic circuit 62. As an option, the shaft may have a return spring 61 attached thereto for forcing the valve 60 into a neutral or starting position. Any rotation to be achieved by the motor, must overcome the torque of spring 61.

The stator comprises a disk-shaped yoke 40, which has columns or poles 41 (on the bottom) and 42 (on the top) extending out on either side of the yoke, and coils 44 (on the bottom) and 45 (on the top), are wrapped around each column in a conventional magnetic winding. Each coil has one input and output wire end 46. By regulating either the direction of current passing through the coil or by changing the direction of the winding of the coil around the poles, each column can become a north or south electromagnet. It is noted that all top poles 42 have coils 45 that are wrapped therearound, thus making up one single electric circuit or "phase" of the motor winding. On the other side of the stator, there is a second phase. Since there are two such electric circuits, making a first and second phase, the motor is called a two-phase motor, where each phase is separately controlled.

Each multiple-pole magnet 32 and 36 has alternating north and south regions abbreviated as N and S accordingly. The lines separating the N and S regions are called transition lines 48, 49 and 50, for example. It is noted that the transition lines are not lined up from the first magnet 32 to the second magnet 36. In particular, line 49 is positioned between lines 48 and 50 when viewed along rotating shaft 52. Additionally, it is noted that the number of stator poles and the number of permanent magnet regions are always the same.

There is a rotating shaft 52, coupled to both rotors 30 and 38, and unattachably extending through holes 54, 56 and 58 in the magnets and stator respectively. Shaft 52 is attached to a device 60 that is to be rotated like a valve in an engine throttle, for example.

Figure 2:
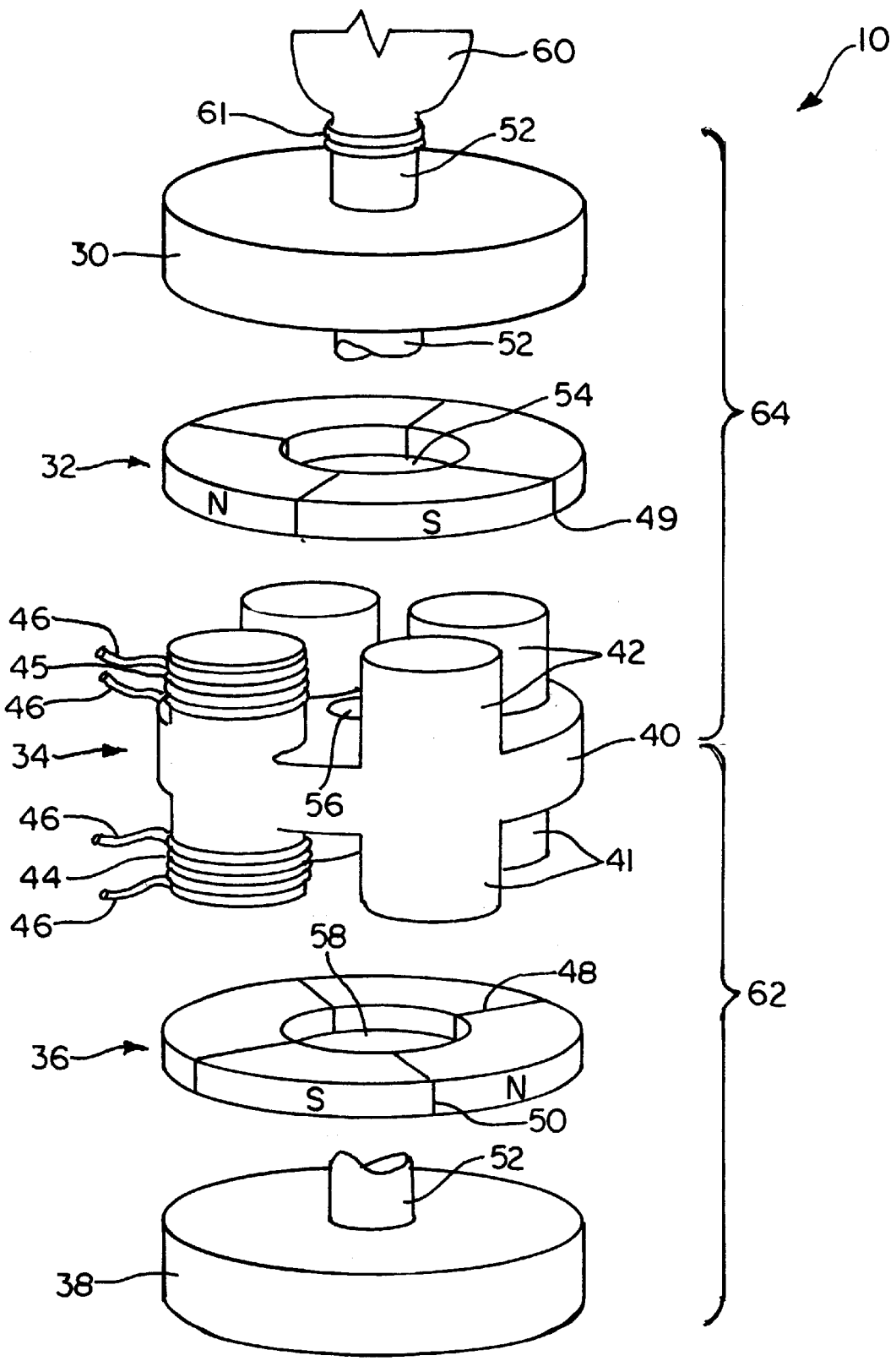
FIG. 2 is a perspective exploded view of the preferred actuator embodiment.

Not shown in FIG. 2 are two thrust bearings that need to be inserted between each rotor and the stator to maintain two air gaps of constant length despite the attraction forces developed by the magnets (permanent and electromagnet).
Operation of the Preferred Embodiment In operation, the stator 34 is typically rotationally fixed. Shaft 52 is coupled to both rotors 30 and 38 and to a device 60, like a valve, which is to be rotated. To rotate the valve to a first position, one possible way occurs when top poles 42 have top coil 45 energized with a DC voltage and current. Top coil 45 converts the top poles 42 into electromagnets. The electromagnets interact with the permanent magnet 32 to produce a rotary torque in one direction. Rotor 30 will move so that its magnetic poles are aligned with the electromagnets of opposite polarity. Once this occurs, the electromagnets cease to produce a rotating torque, and the rotation of the rotor stops.

It is noted that if there is any outside force that moves the rotor from that first position, torque is developed again that forces the rotor into the aligned position. This aligned position is called a detent, holding or locking torque position.

It is possible to rotate the shaft to a second position by doing the same sequence of events with the bottom magnetic circuit 62, and by turning off the top magnetic circuit 64. More particularly, coil 44 is energized to activate the electromagnets on the bottom side of the stator. Since the second permanent magnet 36 has transition lines 48 and 50 misaligned from the top magnet 32, shaft 52 will rotate to a different locking torque position.

It is also possible to rotate the shaft to a third position by activating both the top and bottom magnetic circuits 62 and 64. Again, since the two permanent magnets have misaligned transition lines there will be a third locking torque position balanced between the competing torques from the top 64 and bottom 62 portions of the motor 10.

If in each case the current is reversed in the coils, then the rotors will rotate in the opposite directions, in the three above described situations.

Figure 3:
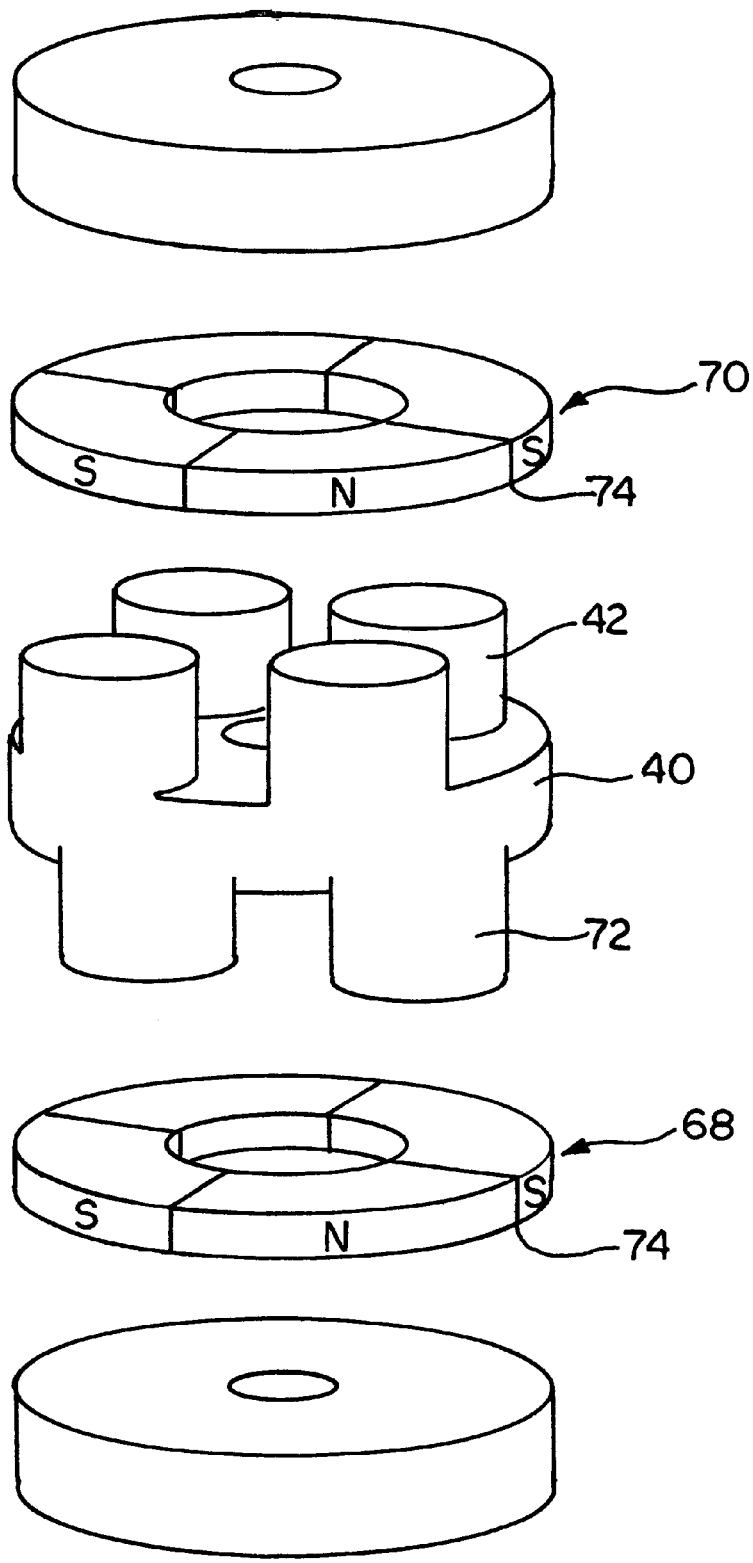
FIG. 3 is a perspective exploded view of an alternative actuator embodiment.

Finally, it is possible to achieve an infinite number of positions in both a forward and reverse direction for the valve. This is achieved by varying the amount of DC current passing through the coils. In this situation, the amount of torque achieved is proportional to the strength of the electromagnets, which is controlled by the amount of current flowing through the coils. Thus, the locking torque position will vary according to the amount of torque applied against the return spring 61 or against any load.
Alternative Embodiment Referring to FIG. 3, there is a perspective exploded view of key portions of an alternative embodiment. It is noted, all of the elements are the same as illustrated in the preferred embodiment of FIG. 2, except the following: Stator 35 has the added feature of having poles 42 being misaligned with new poles 72, and permanent magnets 68 and 70 having transition line 74 aligned with one another. With this alternative design, the operation is the same as in the preferred embodiment, except that it is the offset of the poles and not the transition lines of the magnets that provides the differing locking torque positioning.
Remarks About the Preferred Embodiment One of ordinary skill in the art of designing and using actuators 10 will realize many advantages from studying and using the preferred embodiment. For example, each magnetic circuit comprises a rotor, a magnet, an air gap, and a stator core can be designed first to be short, and secondly to have a cross section that is approximately the same throughout the circuit, therefore making optimal use of all the soft magnetic parts, and the permanent magnets. This leads to high ratios of torque per mass, and torque per power draw.
Variations of the Preferred Embodiment Although the illustrated embodiments discuss the arrangement of an actuator motor, one skilled in the art will realize that the preferred embodiment would work with most any electric motor needing to have self aligning of the bearing device.

An additional variation of the invention contemplates the use of applying any type of bearing device 25 that can allow for proper rotation of the races while being mounted to a slanted surface on the stator.

Another variation is the addition of a soft magnetic flat pole shoe located on top of each stator column. Where the shoe is wider than the stator top surface and hangs over the wound coils between the poles. This shoe will widen the arc spanned by the column's top face and therefore, increase the travel angle over which electromagnetic torque is developed.

A further variation of the preferred embodiment is that the multi-pole magnet could be several single pole magnets placed next to each other.

Another variation is to use one coil every second column, instead of one coil on each column. In this fashion by lining up one magnet and coil the other automatically aligns.

Although it is discussed that the rotors are fixed to the shaft, it is contemplated to have the rotors fixed only on the rotational direction and not the axial direction. In this case, the rotors can slide along the shaft for various reasons, like easier mounting, or to account for thermal expansion differences in the materials, which provides for a loose fit therebetween. In any case, it is important to maintaining rotational alignment between the stator and actuators.

The preferred embodiment illustrates the use of a return spring 61. However, it is contemplated to not use a return spring for designs that have other methods of forcing the rotors back to a starting or neutral position, for example the electromagnetic coils could force the rotors back using known methods.

What is claimed and desired to be secured by United States patent is:

1. A rotary actuator, comprising:
   a) a shaft extending into the actuator;
   b) a first and second rotor, rotationally fixed on the shaft, and having a first and second permanent magnet, respectively mounted thereon in opposing fashion, the first and second magnets each having a plurality of north and south pole magnet regions that are oriented such that the first magnet's north and south pole magnet regions are misaligned with respect to the second magnet's north and south pole magnet regions;
   c) a stator, loosely mounted around the shaft and positioned between the opposing permanent magnets, and having a disc shaped yoke and a plurality of first poles and second poles extending away from the yoke, parallel to the shaft, and toward the first and second rotors respectively; and
   d) a plurality of first and second independent wire coils wrapped around the first and second poles respectively to allow the formation of a plurality of first and second electromagnets respectively by passing electrical current through the first and second wire coils.

2. The actuator of claim 1, wherein the first and second magnets are polarized in a way that will allow the shaft to rotate to a first position when only the first electromagnets are energized, and the shaft is rotated to a second position when only the second electromagnets are energized.

3. The actuator of claim 2, wherein the first and second magnets are polarized in a way that will allow the shaft to rotate to a third position when both the first and second electromagnets are energized.

4. The rotary actuator according to claim 1, wherein the electromagnets generate a magnetic field that is parallel to the shaft and causes rotation of the shaft.

5. The actuator according to claim 1, wherein the plurality of first poles comprises four first poles spaced equidistant around the yoke and the plurality of second poles comprises four second poles spaced equidistant around the yoke.

6. A rotary actuator, comprising:
   a) a shaft extending into the actuator;
   b) a first and second rotor, rotationally fixed on the shaft, and having a first and second permanent magnet, respectively, mounted thereon in opposing fashion, the first and second magnets each having a plurality of north and south pole magnet regions that are oriented such that the first magnet's north and south pole magnet regions are aligned with respect to the second magnet's north and south pole magnet regions;
   c) a stator, loosely mounted around the shaft and positioned between the opposing permanent magnets, and having a disc shaped yoke and a plurality of first poles and second poles extending away from the yoke, parallel to the shaft, and toward the first and second rotors respectively, the first and second poles are oriented such that the first poles are misaligned with the second poles; and
   d) a plurality of first and second independent wire coils wrapped around the first and second poles respectively to allow the formation of a plurality of first and second electromagnets respectively by passing electrical current through the first and second wire coils.

7. The actuator according to claim 6, wherein the plurality of first poles comprises four first poles spaced equidistant around the yoke and the plurality of second poles comprise four second poles spaced equidistant around the yoke.

8. The rotary actuator according to claim 6, wherein the electromagnets generate a magnetic field that is parallel to the shaft and causes rotation of the shaft.

* * * * *